(12) United States Patent
Mullick

(10) Patent No.: US 9,789,812 B2
(45) Date of Patent: Oct. 17, 2017

(54) FORWARD WARNING SYSTEM FOR MOTOR VEHICLES

(76) Inventor: Apu Mullick, Springfield, NJ (US)

( * ) Notice: Subject to any disclaimer, the term of this patent is extended or adjusted under 35 U.S.C. 154(b) by 781 days.

(21) Appl. No.: 12/534,155

(22) Filed: Aug. 3, 2009

(65) Prior Publication Data

US 2011/0025484 A1 Feb. 3, 2011

(51) Int. Cl.
*B60Q 1/26* (2006.01)
*B60Q 1/50* (2006.01)

(52) U.S. Cl.
CPC ............ *B60Q 1/50* (2013.01); *B60Q 2400/50* (2013.01)

(58) Field of Classification Search
USPC .... 340/903, 904, 435, 438, 425.5, 463, 466, 340/468, 471
See application file for complete search history.

(56) References Cited

U.S. PATENT DOCUMENTS

| | | |
|---|---|---|
| 2,158,310 A | 5/1939 | Smith |
| 2,804,160 A | 8/1957 | Rashid |
| 3,448,822 A | 6/1969 | La Lone |
| 3,891,966 A | 6/1975 | Sztankay |
| 3,949,362 A | 4/1976 | Doyle |
| 4,641,136 A | 2/1987 | Kowalczyk |
| 5,471,214 A * | 11/1995 | Faibish et al. .................. 342/70 |
| 5,521,579 A | 5/1996 | Bernhard |
| 5,714,927 A | 2/1998 | Henderson |
| 6,121,896 A | 9/2000 | Rahman |
| 6,198,386 B1 * | 3/2001 | White, II ...................... 340/435 |
| 6,587,043 B1 | 7/2003 | Kramer |
| 7,362,241 B2 | 4/2008 | Kubota |
| 2009/0323046 A1 * | 12/2009 | Tan et al. ..................... 356/4.01 |
| 2012/0025962 A1 * | 2/2012 | Toll ............................... 340/431 |

FOREIGN PATENT DOCUMENTS

JP  H06-270752 A  9/1994

* cited by examiner

*Primary Examiner* — Brent Swarthout
(74) *Attorney, Agent, or Firm* — Symbus Law Group LLC; Clifford D. Hyra

(57) ABSTRACT

A new forward warning system includes one or more light sources (such as lasers) mounted on a vehicle and coupled to one or more of the vehicle's instruments, which control its motion. The vehicle's instrumentation is used to estimate the required stopping distance of the vehicle on which the light source is mounted. When the light source is moved quickly, it "draws" an image on the road surface. The image created on the road surface by the light is based on the vehicle's instrumentation and indicates to other motorists where a danger zone exists in front of the vehicle, just as brake lights warn motorists behind the vehicle that it is slowing or stopped.

8 Claims, 2 Drawing Sheets

FORWARD WARNING SYSTEM FOR MOTOR VEHICLES

FIELDS OF THE INVENTION

The invention relates to vehicles and particularly signaling or warning systems for vehicles.

BACKGROUND OF THE INVENTION

Motorists are not able to accurately judge the distance another vehicle will need to stop safely. As a result, those driving smaller vehicles, such as cars and sport utility vehicles, pass larger trucks and then merge back into the lane of travel in front of the vehicle they just passed. While they may (or may not) leave themselves enough distance to stop before hitting the car in front of them, they do not leave enough distance for the truck behind to stop without hitting them, creating a dangerous situation. For example, see the following chart comparing the stopping distances for cars and trucks.

Stopping Distances for Cars Versus Trucks

| Speed | Reaction/Braking Distance Cars | Reaction/Braking Distance Trucks | Stopping Distance Cars | Stopping Distance Trucks |
| --- | --- | --- | --- | --- |
| 40 mph | 44'/80' | 44'/125' | 124' | 169' |
| 55 mph | 60'/165' | 60'/275' | 225' | 335' |
| 65 mph | 71'/245' | 71'/454' | 316' | 525' |

*Above estimates are for 80,000 lb., loaded tractor-trailers and mid-size passenger cars traveling on a dry, level road.
Source: National Safety Council's Defensive Driving Course for Professional Truck Drivers.

While some systems exist for prototype "self-driving" cars to determine their own stopping distances, or for the driver of a vehicle to determine the stopping distance of the driver's own vehicle in order to maintain a safe following distance, no system exists that gives passing vehicles the information they need regarding the stopping distance of the vehicle they are passing.

Needs exist for a system that indicates the stopping distance of a vehicle to other vehicles that are passing it.

SUMMARY

A new forward warning system includes a source of light mounted on a vehicle and coupled to one or more of the vehicle's instruments, which control its motion. The vehicle's instrumentation is used to estimate the required stopping distance of the vehicle on which the light is mounted. When the light is moved quickly, it "draws" an image on the road surface. The image created on the road surface by the light is based on the vehicle's instrumentation and indicates to other motorists where a danger zone exists in front of the vehicle, just as brake lights warn motorists behind the vehicle that it is slowing or stopped.

For improved visibility and effectiveness, substantially the entire danger zone is marked with the image, and not just a line beyond which it is safe to pass. Passing cars see the image on the road surface and know not to enter the zone of danger, leaving sufficient distance when passing for a safe braking maneuver by the passed car. The driver of the vehicle with the warning system can also see the image, and therefore knows how much distance to leave between his or her vehicle and a leading vehicle, reducing tailgating and rear-end collisions.

A new warning system for vehicles has one or more light sources, a device for translating input from one or more instruments into operation of the one or more light sources, a first connection for connecting the device to one or more instruments, and a second connection for connecting the device to the one or more light sources. In operation, the device receives information from the instruments and controls the light sources based on the information from the instruments in order to create an image on a surface that delineates a zone of danger. In one embodiment, the device includes a processor. In one embodiment, the light sources are lasers.

In one embodiment, the one or more light sources are movable and the control of the light sources includes control of their movement. In one embodiment, the zone of danger is an area in front of a vehicle within which the vehicle would be unable to safely stop. In that embodiment, the image can be an outline of a box and an "X" within the box, or a shaded-in box. The information from the instruments includes the speed of a vehicle and may also include vehicle weight, weather information, route slope, feedback from recent braking, vehicle maintenance condition, driver perception and reaction time, brake lag, and/or brake fade due to overheating.

In one embodiment, the one or more light sources are one or more movable lasers, the control of the light sources includes control of the movement of the movable lasers, and the image is created by rapid movement of the movable lasers.

In a new forward warning method for vehicles information is gathered from one or more vehicle instruments, a safe stopping distance for a vehicle is determined based on the information, and a light source is manipulated on the basis of the safe stopping distance to create an image on a surface that delineates a zone of danger. The zone of danger is an area in front of the vehicle structure within which the vehicle would be unable to safely stop. In one embodiment, the manipulation of the light source to create an image is carried out by rapidly moving one or more lasers.

A new vehicle has a vehicle structure, one or more lasers mounted on the vehicle structure, one or more vehicle instruments, and a processor connected to one or more of the vehicle instruments and to the one or more lasers. The processor controls the lasers based on information from the vehicle instruments to create an image on a surface that delineates a zone of danger. In one embodiment, the zone of danger is an area in front of the vehicle structure within which the vehicle would be unable to safely stop. The lasers are movable lasers and the control of the lasers includes control of the movement of the lasers. The image is created by rapid movement of the movable lasers.

These and further and other objects and features of the invention are apparent in the disclosure, which includes the above and ongoing written specification, with the drawings.

BRIEF DESCRIPTION OF THE DRAWINGS

The invention will be more particularly described in conjunction with the following drawings wherein.

DETAILED DESCRIPTION

Figure 1A:
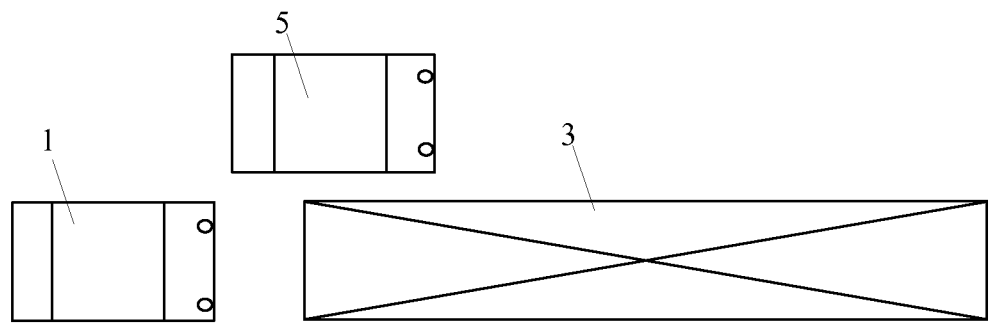
FIGS. 1A and 1B are diagrams of forward warning systems in use on automobiles in traffic.

In a new forward warning system, a light source (such as a "laser pointer", or alternatively a colored headlight, LED light, etc.) is mounted on a vehicle and coupled to one or more of the vehicle's instruments, which control its motion. The light source may be coupled to the instruments with a mechanical connection or through a processor. When the light is moved quickly, it "draws" an image on the road surface, as is commonly done in a laser light show. The "drawing" created on the road surface by the light is an indication to other motorists of where a danger zone exists in front of the vehicle, just as brake lights warn motorists behind the vehicle that it is slowing or stopped.

In alternative embodiments, some or all of the light sources do not move. The image on the road surface can be changed by, for example, turning on or off one or more of the light sources, changing the angle of one or more of the light sources, or partially shielding or revealing one or more of the light sources.

In one embodiment, the drawing created on the road surface is an outline of a box and an "X" within the box marking the danger zone. In another embodiment, the drawing is a shaded-in box, similar to what you get if you move a laser pointer back and forth over the same area quickly. In any case, the entire danger zone is preferably marked with the drawing, and not just a line beyond which it is safe to pass. A line could be too far down the road such that a driver of a passing car would not realize that it applies to the vehicle he or she just passed. Furthermore, such a line could be obscured if another vehicle has already entered the danger zone. It is not necessary for the drawing/image to extend all the way to the front of the vehicle, as long as it begins close enough to the car that a passing vehicle could not fit in the gap between the front of the car and the beginning of the image.

One or more lights may be required to draw the image depending on the image, the power of the lights, size of the vehicle, potential atmospheric conditions, and other factors. The more powerful the lights are, the fewer are required to draw a given image, however a more powerful light risks being too bright if inadvertently aimed at oncoming traffic instead of the roadway, similarly to how HID headlights blind other drivers.

The vehicle's instrumentation is used to estimate the required stopping distance of the vehicle on which the laser is mounted. Information that can be used by the system to estimate a safe stopping distance includes, but is not limited to, speed, vehicle weight, weather information, slope, feedback from recent braking, vehicle maintenance condition (new brakes vs. worn brakes, types of tires, etc.), driver perception and reaction time (low visibility, tired, drunk, etc.), and any combination thereof. The system can also take into account whether the vehicle is equipped with air brakes, for which there is a brake lag, and the fact that excessive braking can cause brake fade due to overheating.

The information used to estimate stopping distance is basic in some embodiments, e.g. just speed, and more complex in others, depending on the desired balance of precision and complexity. Much of the information can be obtained from existing instrumentation commonly included in vehicles. Other information can be gathered using known sensors that may be added to a vehicle to supplement its existing instruments.

A secondary benefit of the warning system is that some drivers underestimate the distance required to stop their own vehicle. If the drivers are using this system, they can see the image from their own vehicle as well, and therefore will know how much distance to leave themselves. This will reduce tailgating and rear-end collisions.

This system is perhaps of the greatest use to larger vehicles such as tractor-trailers and fire trucks. The typical passenger car driver has never driven a large vehicle of this type and therefore has little experience with or knowledge of the safe stopping distance required by such vehicles. This lack of knowledge leads passing vehicles to systematically leave such larger vehicles with insufficient space to stop. Truck drivers, for example, could benefit greatly from a forward warning system, as they are often cut off by other motorists and left without a cushion of safety in front of their vehicles. In combination with the high mass of such large vehicles, this leads to extremely dangerous situations and causes serious accidents.

However, the system is of use to every motor vehicle on the road. Stopping distances vary with vehicle type, slope, road condition, weather, and other factors. It is impossible for the average driver to accurately account for each of these variables. This system therefore greatly increases safety under all conditions for all vehicles. All organizations interested in increased highway safety, such as the National Highway Traffic Safety Administration, American Automobile Association, and police/fire/emergency medical agencies have an interest in drivers being more informed and safe.

In the several figures, like reference numerals refer to like parts having like functions.

Figure 1B:
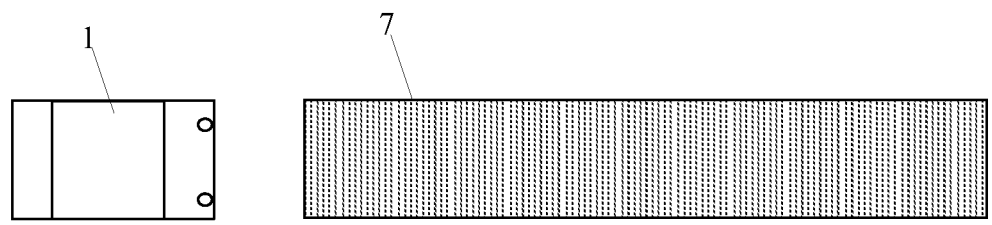

FIGS. 1A and 1B are diagrams of forward warning systems in use on automobiles in traffic. An automobile 1 is equipped with a forward warning system that creates an image 3, 7 on a road surface that is visible to a passing car 5. In FIG. 1A the image 3 is a box with an X inside and in FIG. 1B the image 7 is a shaded box.

Figure 2:
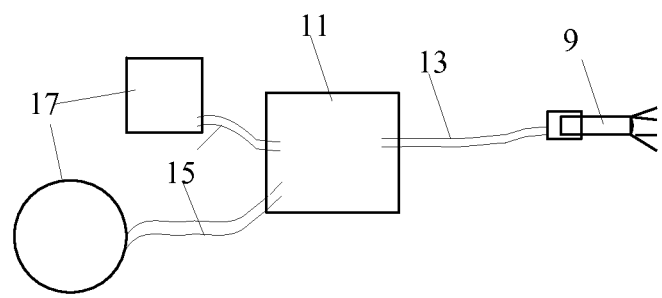
FIG. 2 is a diagram of a forward warning system utilizing a processor connected to instruments.

FIG. 2 is a diagram of a forward warning system utilizing a processor 11 connected to instruments 17. An electrical connection 15 connects the instruments 17 and processor 11 and electrical connection 13 connects the processor 11 with light source 9.

Figure 3:
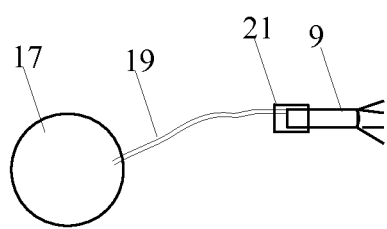
FIG. 3 is a diagram of a forward warning system with a mechanical connection between an instrument and a device that controls a light source.

FIG. 3 is a diagram of a forward warning system with a mechanical connection 19 between an instrument 17 and a device 21 that controls a light source 9. The instrument may be for example a speedometer, which transmits the speed of a vehicle mechanically to device 21 that automatically adjusts the angle of the light source 9 or turns it on or off in order to adjust the image displayed on a road surface.

The invention is not limited to the particular embodiments illustrated in the drawings and described above in detail. Those skilled in the art will recognize that other arrangements could be devised, for example, different images could be used to display the zone of danger, different light source technologies could be used to create the image, different information could be used to calculated a safe stopping distance, etc. While the invention has been described with reference to specific embodiments, modifications and variations of the invention may be constructed without departing from the scope of the invention.

I claim:

1. A forward warning method for vehicle, comprising:
    gathering information from one or more vehicle instruments,
    determining a safe stopping distance for a vehicle based on the information, and
    manipulating a light source on the basis of the safe stopping distance to create an image on a surface that automatically adjusts to delineate a zone of danger, wherein the zone of danger is an area of the surface in front of the vehicle, extending from within a car's length in front of the vehicle to the safe stopping distance for the vehicle, within which the vehicle would be unable to safely stop and which is therefore unsafe for passing vehicles to enter;

wherein the information from one or more vehicle instruments comprises the speed of the vehicle, vehicle weight, weather information, and route slope.

2. The forward warning method of claim 1, wherein the manipulating a light source to create an image comprises rapidly moving one or more lasers.

3. The forward warning method of claim 1, wherein the image is configured so vehicles adjacent to the vehicle can view the image on the surface in front of the vehicle where it is unsafe to pass the vehicle.

4. The forward warning method of claim 1, wherein the light source is movable and wherein the manipulation of the light source comprises controlling movement of the light source.

5. The forward warning method of claim 4, wherein the light source comprises movable lasers.

6. The forward warning method of claim 1, wherein the information from one or more vehicle instruments further comprises at least one of the group consisting of feedback from recent braking, vehicle maintenance condition, driver perception and reaction time, brake lag, and brake fade due to overheating.

7. The forward warning method of claim 1, wherein the image is an outline of a box and an "X" within the box.

8. The forward warning method of claim 1, wherein the image is a shaded-in box.

* * * * *